(12) United States Patent
Takahashi et al.

(10) Patent No.: US 9,963,164 B2
(45) Date of Patent: May 8, 2018

(54) STEERING DEVICE

(71) Applicant: YAMADA MANUFACTURING CO., LTD., Kiryu-shi (JP)

(72) Inventors: Ryosuke Takahashi, Kiryu (JP); Yuji Matsuda, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 48 days.

(21) Appl. No.: 15/018,689

(22) Filed: Feb. 8, 2016

(65) Prior Publication Data
US 2016/0251026 A1   Sep. 1, 2016

(30) Foreign Application Priority Data

Feb. 27, 2015   (JP) .................................. 2015-038802
Dec. 25, 2015   (JP) .................................. 2015-255173

(51) Int. Cl.
*B62D 1/184* (2006.01)
*B62D 1/185* (2006.01)
*B62D 1/187* (2006.01)

(52) U.S. Cl.
CPC .................................. *B62D 1/184* (2013.01)

(58) Field of Classification Search
CPC ...................................................... B62D 1/184
See application file for complete search history.

(56) References Cited

U.S. PATENT DOCUMENTS

| | | | | |
|---|---|---|---|---|
| 8,505,407 B2* | 8/2013 | Nomura | ................. | B62D 1/184 280/775 |
| 8,578,812 B2* | 11/2013 | Minamigata | ........... | B62D 1/184 280/775 |
| 8,757,664 B2* | 6/2014 | Moriyama | ............. | B62D 1/184 280/775 |
| 8,919,220 B2* | 12/2014 | Moriyama | ............. | B62D 1/184 280/775 |
| 9,180,902 B2* | 11/2015 | Nagasawa | ............... | B22D 17/00 |
| 9,254,860 B2* | 2/2016 | Mihara | ................... | B62D 1/185 |
| 9,283,983 B2* | 3/2016 | Kii | .......................... | B62D 1/184 |
| 9,550,513 B2* | 1/2017 | Fujiwara | ................ | B62D 1/195 |

(Continued)

FOREIGN PATENT DOCUMENTS

JP   2007-223383 A   9/2007
WO  WO-2014163112 A1 * 10/2014

*Primary Examiner* — Paul N Dickson
*Assistant Examiner* — Joselynn Y Sliteris
(74) *Attorney, Agent, or Firm* — McGinn IP Law Group, PLLC.

(57) ABSTRACT

A steering device includes: an inner pipe; an outer column that includes an embracing main body section embracing the inner pipe and a clamp configured by both tightening sections formed in width-direction both edge parts of a slit section, the slit section being formed in a lower part of the embracing main body section and along an axial direction; a fixed bracket that includes fixed side sections holding therebetween the outer column; and a tightening fixture that tightens the fixed bracket and the outer column. The steering device further includes: first contact sections that are formed on respective outer surface sides of both the tightening sections of the outer column; and third contact sections that are located above an axis of the embracing main body section of the outer column and formed to project in a horizontal diameter direction.

12 Claims, 6 Drawing Sheets

(56) References Cited

U.S. PATENT DOCUMENTS

| 9,688,300 | B2 * | 6/2017 | Matsumoto | B62D 1/185 |
| 9,707,990 | B2 * | 7/2017 | Matsumoto | B62D 1/185 |
| 2007/0068311 | A1 * | 3/2007 | Shimoda | B62D 1/195 74/493 |
| 2017/0029011 | A1 * | 2/2017 | Okada | B62D 1/187 |

* cited by examiner

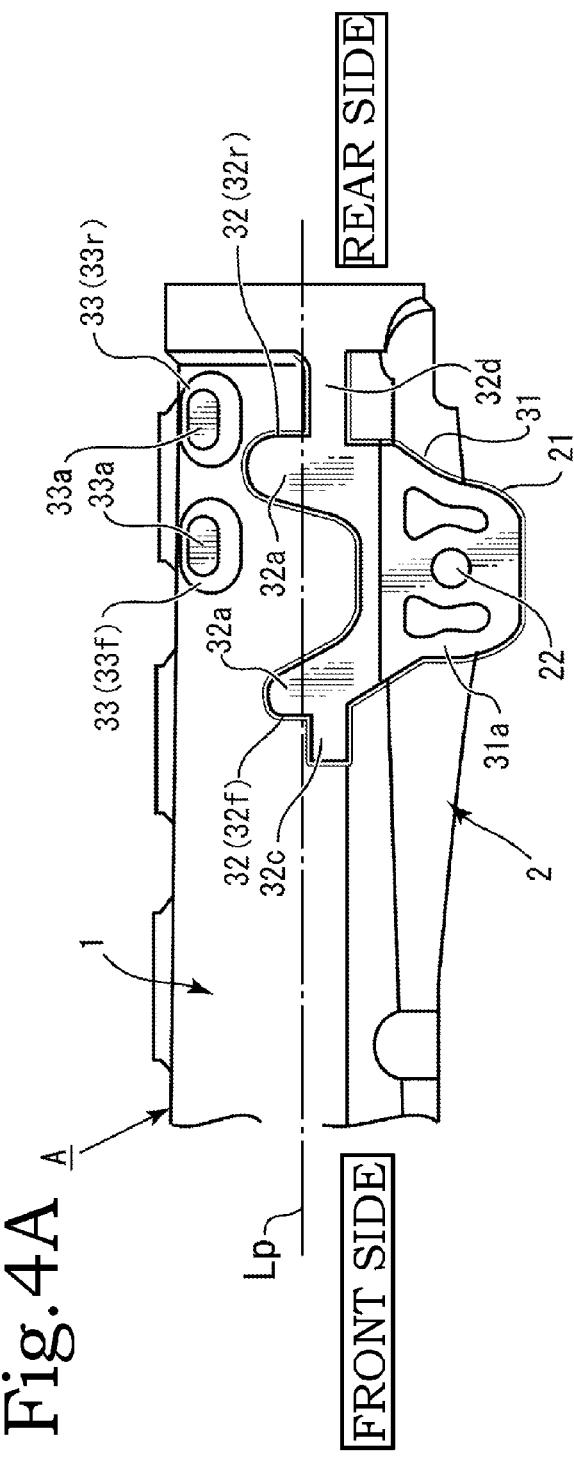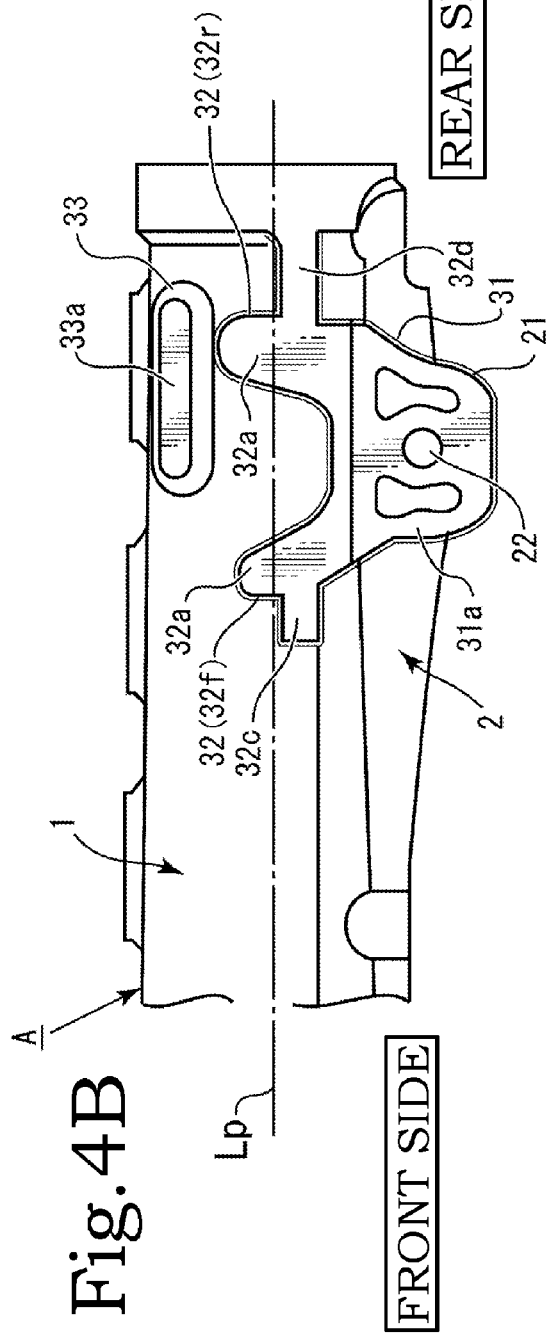

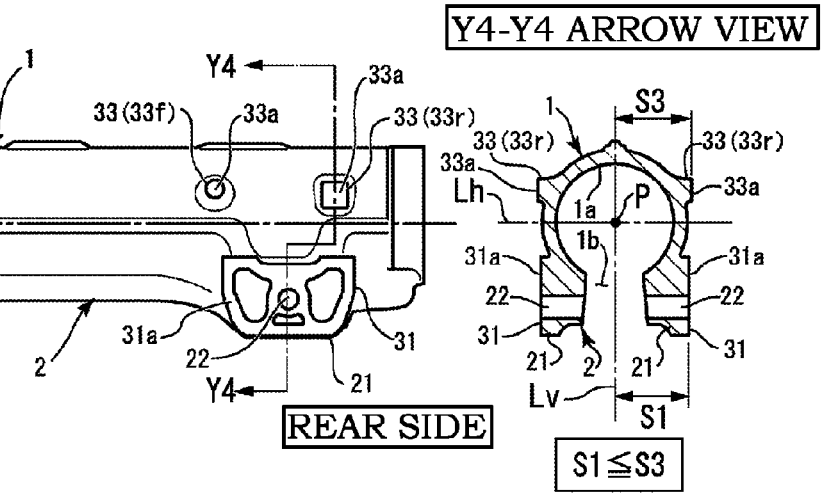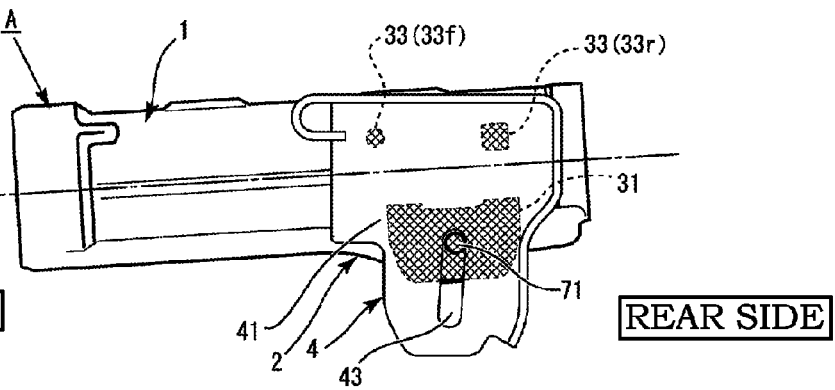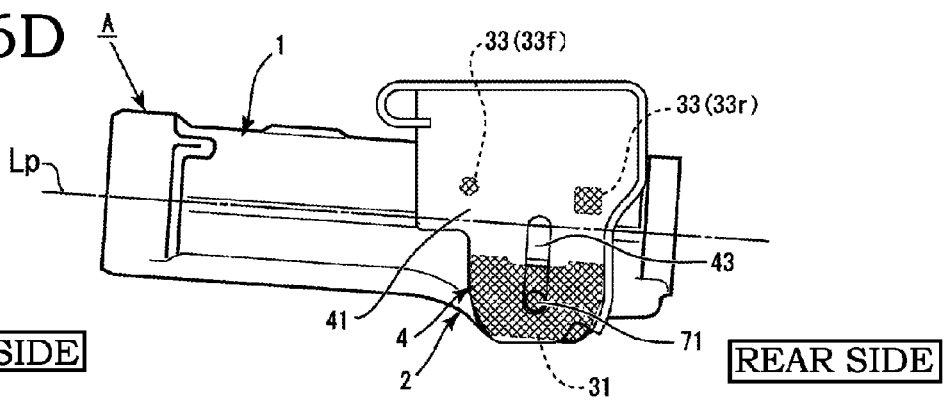

STEERING DEVICE

BACKGROUND OF THE INVENTION

1. Field of the Invention

The present invention relates to a steering device including a tilt/telescopic mechanism, the steering device being capable of suppressing variation in a tightening force that occurs in a tightening state due to a level of a height position of an outer column by tilt adjustment and also capable of maintaining stable tightening rigidity.

2. Description of the Related Art

One type of the steering device including the tilt/telescopic mechanism is a steering device including an outer column that supports a steering shaft to be able to slide in an axial direction and to be fixed. The outer column moves up and down with respect to a fixed bracket. As the steering device of this type, there is a steering device disclosed in Japanese Patent Application Laid-Open No. 2007-223383 (Patent Literature 1). Details of the steering device disclosed in Patent Literature 1 are generally explained below, with components denoted by reference numerals and signs in parentheses.

Contact surfaces (16A, 16B) are formed in the vicinity of the axis of an outer column (1) on left and right side surfaces of the outer column (1). When a tightening rod (34) is loosened, the contact surfaces (16A, 16B) have slight gaps between the contact surfaces (16A, 16B) and inner side surfaces (321A, 321B) of side plates (32A, 32B). When the tightening rod (34) is tightened, the contact surfaces (16A, 16B) respectively come into contact with the inner side surfaces (321A, 321B) of the side plates (32A, 32B).

As shown in FIG. 3 of Patent Literature 1, the contact surfaces (16A, 16B) extend to a vehicle body rear side from a vehicle body front side end face (14) of the outer column (1) and are formed to a position slightly beyond vehicle body rear ends of telescopic long grooves (12A, 12B) formed in clamps (11A, 11B). Therefore, the contact surfaces (16A, 16B) come into contact with inner side surfaces (321A, 321B) of the side plates (32A, 32B) over the entire length of a telescopic position adjustment range of the outer column (1).

On side surfaces of the clamps (11A, 11B), contact surfaces (17A, 17B) are formed in the vicinity of the axis of the tightening rod (34). The contact surfaces (17A, 17B) are lightly in contact with the inner side surfaces (321A, 321B) of the side plates (32A, 32B) even when the tightening rod (34) is loosened. The contact surfaces (17A, 17B) are capable of coming into contact with the inner side surfaces (321A, 321B) of the side plates (32A, 32B) over the entire length of the telescopic position adjustment range of the outer column (1).

In Patent Literature 1, the contact surfaces (16A, 16B) extend to the vehicle body rear side from the vehicle body front side end face (14) of the outer column (1). The contact surfaces (17A, 17B) are formed to extend long in the axial direction over the entire length of the telescopic position adjustment range of the outer column (1). Therefore, the contact surfaces (16A, 16B) and the contact surfaces (17A, 17B) are formed to be in long surface contact, in the axial direction, with the inner side surfaces (321A, 321B) of the side plates (32A, 32B) of a vehicle body attachment bracket (3).

However, the vehicle body attachment bracket (3) is a metal plate. The side plates (32A, 32B) bend when the tightening rod (34) is tightened. The contact surfaces (16A, 16B) and the contact surfaces (17A, 17B) do not entirely come into contact with the side plates (32A, 32B) but partially come into contact with the side plates (32A, 32B).

Bending sections differ from vehicle to vehicle and tightening operation to tightening operation. It is likely that sections requiring contact most, that is, sections having weak rigidity, are not in contact with the contact surfaces (16A, 16B) and the contact surfaces (17A, 17B). Then, it is likely that a difference in rigidity in the axial direction of the outer column (1) increases and tightening rigidity decreases. The contact surfaces (16A, 16B) and the contact surfaces (17A, 17B) are formed long in the axial direction. Machining is also applied to sections that the contact surfaces (16A, 16B) and the contact surfaces (17A, 17B) do not come into contact with because of the bending of the side plates (32A, 32B). Therefore, there are many machined surfaces, costs increase, and weight also increases.

SUMMARY OF THE INVENTION

It is an object (a technical problem to be solved) of the present invention to provide a steering device that can suppress variation in a tightening force that occurs in a tightening state due to a level of a height position of an outer column by tilt adjustment and maintain stable tightening rigidity.

Therefore, in order to solve the problems, as a result of intensive research, the inventor has solved the problems by devising a steering device according to a first embodiment including: an inner pipe; an outer column that includes an embracing main body section embracing the inner pipe and a clamp configured by both tightening sections formed in width-direction both edge parts of a slit section, the slit section being formed in a lower part of the embracing main body section and along an axial direction; a fixed bracket that includes fixed side sections holding therebetween the outer column; and a tightening fixture that tightens the fixed bracket and the outer column, the steering device further including: first contact sections that are formed on respective outer surface sides of both the tightening sections of the outer column; and third contact sections that are located above an axis of the embracing main body section of the outer column and formed to project in a horizontal diameter direction.

According to a second embodiment, in the steering device according to the first embodiment, at least a pair of the third contact sections may be formed at a predetermined interval along the axial direction. According to a third embodiment, in the steering device according to the second embodiment, the third contact section on a rear side may have a distal end face larger than a distal end face of the third contact section on a front side. According to a fourth embodiment, in the steering device according to the first or second embodiment, the steering device may further include second contact sections formed over an up-down direction of the embracing main body section above both the tightening sections and below the third contact sections, distal end faces of the third contact sections and the second contact sections may be located on the same surface in the horizontal diameter direction of the embracing main body section, and the first contact sections may be located in positions not beyond the distal end faces in the horizontal diameter direction of the third contact sections and the second contact sections.

According to a fifth embodiment of the present invention, in the steering device according to the first or second embodiment, the third contact sections may be formed in a cylindrical protrusion shape. According to a sixth embodiment of the present invention, in the steering device according to the fourth or fifth embodiment, the second contact sections may be separated into two at a predetermined interval along the axial direction. According to a seventh embodiment of the present invention, in the steering device according to the fourth or fifth embodiment, lower parts of the second contact sections may be formed to extend along the axial direction.

In the present invention, the steering device includes the first contact sections formed on the respective outer surface sides of both the tightening sections of the outer column and the third contact sections located above the axis of the embracing main body section of the outer column formed to project in the horizontal diameter direction. Therefore, when tilt/telescopic adjustment is completed and the fixed bracket and the outer column are tightened by the tightening fixture, variation in a contact state of the fixed side sections of the fixed bracket and the outer column is prevented to keep tightening rigidity. Consequently, it is possible to maintain stable tightening rigidity for the inner pipe by both the tightening sections of the outer column by the tightening fixture.

BRIEF DESCRIPTION OF THE DRAWINGS

FIG. 4A is a main part side view of an outer column of an embodiment including two third contact sections formed in a short ellipse in the first embodiment;

FIG. 4B is a main part side view of an outer column of an embodiment including one third contact section formed in a long ellipse;

FIG. 6A is an enlarged side view of an outer column in a second embodiment;

FIG. 6B is a Y4-Y4 arrow sectional view of FIG. 6A;

FIG. 6C is a main part side view showing a contact state of first contact sections and third contact sections and fixed side sections of a fixed bracket on a tilt upper stage position in the second embodiment; and FIG. 6D is a main part side view showing a contact state of the first contact sections and the third contact sections and the fixed side sections of the fixed bracket in a tilt lower stage position in the second embodiment.

DESCRIPTION OF THE PREFERRED EMBODIMENTS

Embodiments of the present invention are explained below with reference to the drawings. In the explanation, there are words "front side" and "rear side" as words indicating directions. The front side and the rear side are based on a front-back direction of an automobile in a state in which a steering device in the present invention is mounted on an automobile. Specifically, in constituent members of the steering device, a front wheel side of the automobile is set as the front side and a steering wheel side of the automobile is set as the rear side. A front-back direction of the steering device is sometimes referred to as axial direction.

Figure 1A:
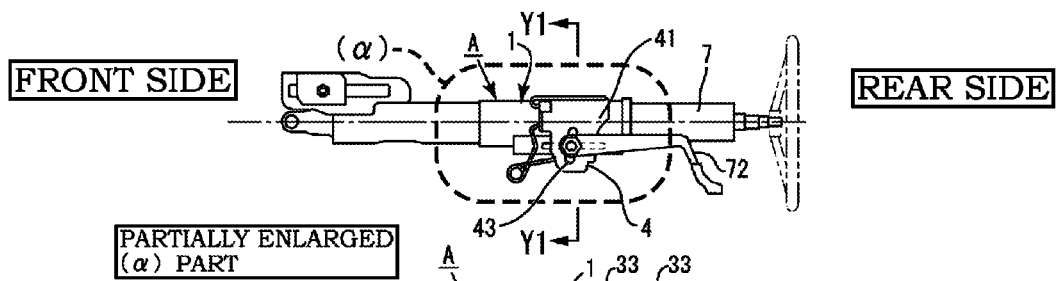
FIG. 1A is a side view of a steering device according to a first embodiment of the present invention.
Figure 1B:
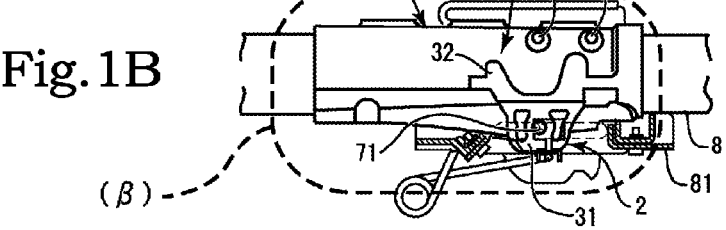
FIG. 1B is a partial sectional enlarged view of an (a) part of FIG. 1A.

In the present invention, there are a first embodiment and a second embodiment. First, a steering device in the first embodiment includes a tilt/telescopic mechanism as shown in FIGS. 1A 1B, and 1D. The steering device is configured mainly from an outer column A, a fixed bracket 4, a tightening fixture 7, an inner pipe 8, and the like. On the inside of the inner pipe 8, a steering shaft configuring the steering device is mounted to be rotatable in a circumferential direction. A steering wheel is mounted on a rear end side.

Figure 1C:
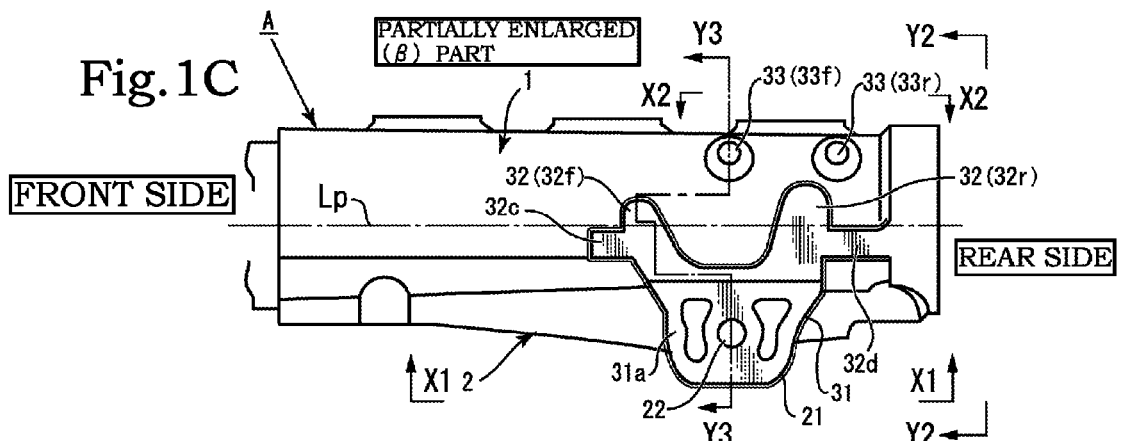
FIG. 1C is an enlarged side view of an outer column in a (β) part of FIG. 1B.
Figures 1D, 1E:
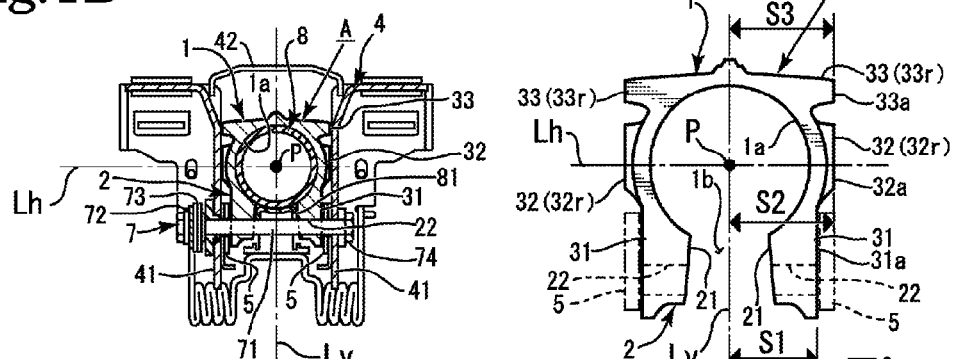
FIG. 1D is a Y1-Y1 arrow enlarged sectional view of FIG. 1A.
FIG. 1E is a Y2-Y2 arrow view of FIG. 1C.
Figure 2A:
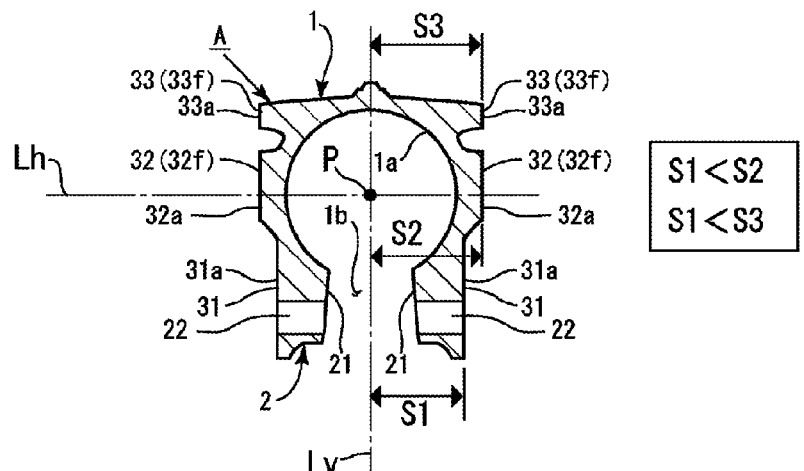
FIG. 2A is a Y3-Y3 arrow sectional view of FIG. 1C in the first embodiment.
Figure 2B:
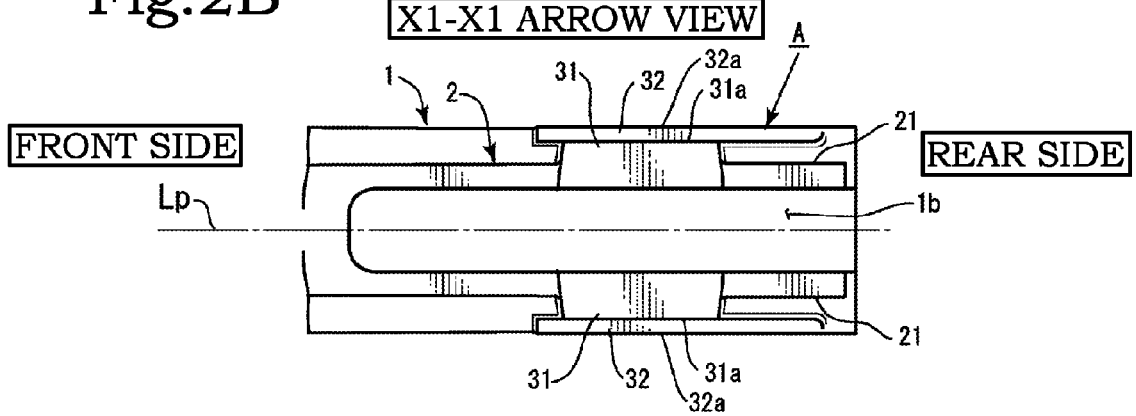
FIG. 2B is an X1-X1 arrow view of FIG. 1C.
Figure 2C:
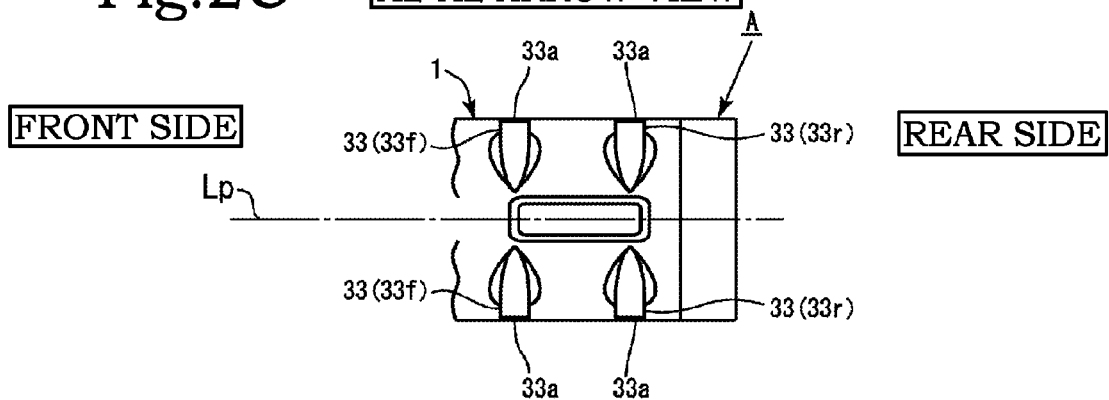
FIG. 2C is an X2-X2 arrow view of FIG. 1C.

The outer column A includes an embracing main body section 1 and a clamp 2 (see FIGS. 1C and 2). The embracing main body section 1 is formed in a substantially cylindrical shape, the inside of which is formed in a hollow shape. Specifically, the inside of the embracing main body section 1 includes an embracing inner circumferential section 1a formed in a hollow shape. A slit section 1b is formed on a lower side in the perpendicular diameter direction of the embracing main body section 1 (see FIGS. 1E and 2B).

The slit section 1b is an air gap portion formed substantially in a U shape from the front side to the rear side in the axial direction of the embracing main body section 1 (see FIG. 2B). Edge portions opposed to each other on both sides in the width direction of the slit section 1b come close to each other, whereby the embracing inner circumferential section 1a shrinks and the inner diameter of the embracing inner circumferential section 1a decreases. It is possible to tighten and lock (fix) the inner pipe 8 housed and mounted in the embracing main body section 1.

The clamp 2 is integrally formed in a lower part of the embracing main body section 1 and from near width direction both ends of the slit section 1b part. The clamp 2 is configured by symmetrical tightening sections 21. Tightening holes 22, through which a bolt shaft 71 of the tightening fixture 7 is inserted, are respectively formed in the tightening sections 21. Both the tightening sections 21 are formed integrally with the embracing main body section 1 to be opposed to, in a substantially parallel state, positions at width direction both side ends of the slit section 1b. The outer column A is made of an aluminum diecast.

The fixed bracket 4 is configured from fixed side sections 41 formed on both sides in the width direction and an attachment top section 42 (see FIGS. 1A and 1D). In both the fixed side sections 41, long holes for tilt 43 are formed as long holes in a substantially up-down direction or a longitudinal direction. The tightening fixture 7 is configured from the bolt shaft 71, a lock lever section 72, a tightening cam 73, and a nut 74. The tightening fixture 7 is attached by the nut 74 together with the lock lever section 72 and the tightening cam 73 (see FIG. 1D). An intermediate object 5 such as a friction plate is sometimes provided between the outer column A and both the fixed side sections 41 of the fixed bracket 4 (see FIG. 1D).

In the configuration of the steering device in the present invention, the inner pipe 8 is attached to the embracing inner circumferential section 1a of the outer column A in an embraced state. A stopper bracket 81 is firmly attached to a predetermined position of the inner pipe 8 by firmly attaching means such as welding. The stopper bracket 81 is disposed in the slit section 1b of the outer column A. The stopper bracket 81 has a function of determining a telescopic adjustment range during telescopic adjustment.

The bolt shaft 71 of the tightening fixture 7 is inserted through the long holes for tilt 43 of both the fixed side sections 41 and the tightening holes 22 of the outer column A. The bolt shaft 71 is attached to be capable of being locked and unlocked by the lock lever section 72, the tightening cam 73, and the nut 74. The tightening sections 21 configuring the clamp 2 of the outer column A is formed integrally with the embracing main body section 1. The tightening sections 21 are formed in a substantially square shape when viewed from a side surface.

The outer column A includes first contact sections 31, second contact sections 32, and third contact sections 33. First, the first contact sections 31 are formed on the outer side surfaces of the tightening sections 21 (see, FIGS. 1C and 1E, FIG. 2A, etc.). Specifically, the first contact sections 31 are distal end faces 31a in the width direction that form the outer side surfaces of the tightening sections 21. The distal end faces 31a are surfaces orthogonal to a horizontal diameter direction of the embracing inner circumferential section 1a of the embracing main body section 1.

The horizontal diameter direction of the embracing inner circumferential section 1a is a direction along a horizontal line that passes an axis P of the embracing inner circumferential section 1a in the horizontal direction. The horizontal diameter direction is referred to as horizontal direction line Lh. That is, the distal end faces 31a are perpendicular surfaces to the horizontal direction line Lh. The tightening holes 22 are formed in the tightening sections 21. When the clamp 2 of the outer column A is held by both the fixed side sections 41 of the fixed bracket 4, the first contact sections 31 come into contact with the inner side surfaces of the fixed side sections 41. When the intermediate object 5 is mounted between the outer column A and the fixed bracket 4, the first contact sections 31 come into contact with the inner side surfaces of the fixed side sections 41 via the intermediate object 5.

The second contact sections 32 are parts formed in a swelling shape from the outer circumference of the embracing main body section 1 of the outer column A. The distal ends of the second contact sections 32 are distal end faces 32a. The distal end faces 32a are formed on flat surfaces orthogonal to the horizontal direction line Lh that passes the axis P of the embracing inner circumferential section 1a. The second contact sections 32 are formed in the up-down direction across an axis line Lp that passes the axis P of the embracing inner circumferential section 1a. That is, the second contact sections 32 are formed to be located in the middle in the vertical direction of the width direction both side surfaces of the embracing main body section 1.

The second contact sections 32 are formed along the axial direction on the lower side of the embracing main body section 1. At least one or a plurality of second contact sections 32 are formed. In the following explanation, an embodiment is explained in which two second contact sections are formed at a predetermined interval along the axial direction on the lower side of the embracing main body section 1.

The second contact section 32 on the vehicle body front side is referred to as front-side second contact section 32f and the second contact section 32 on the vehicle body rear side is referred to as rear-side second contact section 32r. The second contact sections 32 are formed in a substantially V shape by the front-side second contact section 32f and the rear-side second contact section 32r. An axial direction distance between the front-side second contact section 32f and the rear-side second contact section 32r is set as appropriate. Specifically, the axial direction distance is an interval at which the front-side second contact section 32f and the rear-side second contact section 32r can be simultaneously entirely or partially covered by the fixed side sections 41 in a state in which the outer column A is properly supported by the fixed bracket 4.

An extended section 32c extending in the axial direction front side is formed below the front-side second contact section 32f. An extended section 32d extending in the axial direction rear side is formed below the rear-side second contact section 32r (see FIG. 1C). The extended section 32c and the extended section 32d are formed below the axis line Lp of the outer column A and formed above the first contact sections 31 (see FIG. 1C).

In some cases, both of the extended section 32c of the front-side second contact section 32f and the extended section 32d of the rear-side second contact section 32r are not formed. In some cases, only one of the extended section 32c and the extended section 32d is formed and the other is not formed.

The third contact sections 33 are formed in a protrusion shape projecting outward along the horizontal direction line Lh from the axis P of the embracing inner circumferential section 1a of the outer column A. The third contact sections 33 formed in the protrusion shape are formed above the axis P of the embracing inner circumferential section 1a. Specifically, the third contact sections 33 formed in the protrusion shape has a substantially cylindrical shape. Distal end faces 33a are circular flat surfaces that form surfaces orthogonal to the horizontal diameter.

One or two third contact sections 33 are formed along the axial direction of the embracing main body section 1. In the explanation in this embodiment, two third contact sections are formed along the axial direction. The third contact section 33 on the vehicle body front side is referred to as front-side third contact section 33f. The third contact section 33 on the vehicle body rear side is referred to as rear-side third contact section 33r. The front-side third contact section 33f and the rear-side third contact section 33r are formed in positions at the same height from the axis line Lp. An interval in the axial direction between the front-side third contact section 33f and the rear-side third contact section 33r is set as appropriate.

Specifically, the interval is an interval at which the front-side third contact section 33f and the rear-side third contact section 33r can be simultaneously entirely or partially covered by the fixed side sections 41 in the state in which the outer column A is properly supported by the fixed bracket 4. The area of the distal end faces of the third contact sections 33 (the front-side third contact section 33f and the rear-side third contact section 33r) is smaller compared with the first contact sections 31 and the second contact sections 32.

As another embodiment of the third contact sections 33, there is an embodiment in which the distal end faces 33a are formed in an elliptical shape (see FIGS. 4A and 4B). In this embodiment, when the distal end faces 33a are formed in an elliptical shape short in the axial direction, two third contact sections 33 are formed along the axial direction of the embracing main body section 1 (see FIG. 4A). When the distal end faces 33a are formed in an elliptical shape long in the axial direction, one third contact section 33 is formed along the axial direction of the embracing main body section 1 (see FIG. 4B).

The distal end faces 31a at the distal ends in the width direction of the first contact sections 31 and the distal end faces 32a and the distal end faces 33a at the distal ends in the width direction of the second contact sections 32 and the third contact sections 33 are located on the same surface on the surface orthogonal to the horizontal diameter direction. Specifically, a distance S1 to the distal end faces 31a of the first contact sections 31 with respect to a vertical direction line Lv that passes the axis P in the vertical direction, a distance S2 to the distal end faces 32a of the second contact sections 32 with respect to the vertical direction line Lv, and a distance S3 to the distal end faces 33a of the third contact sections 33 with respect to the vertical direction line Lv are formed equal (and substantially equal) to one another.

Figure 5:
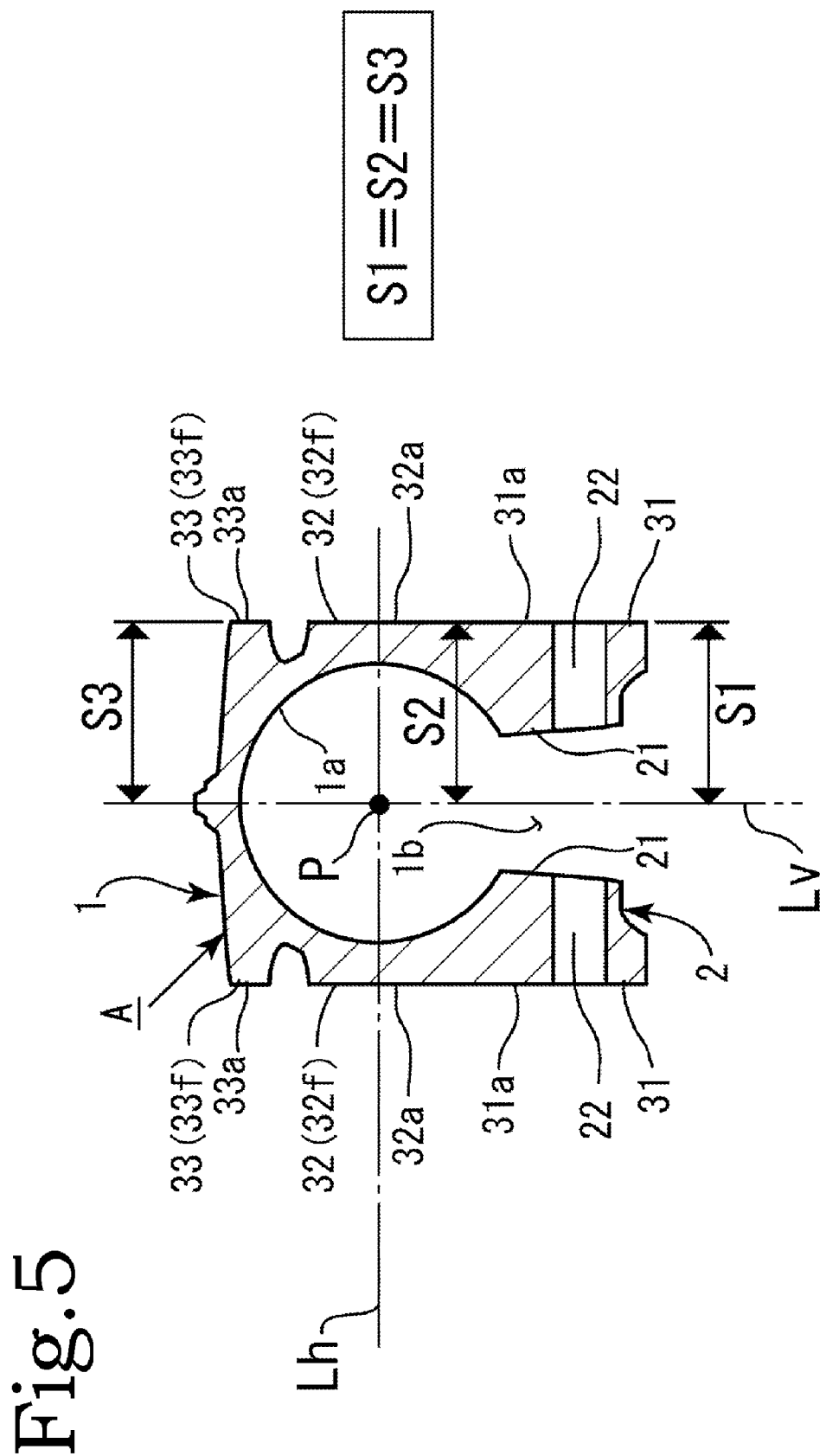
FIG. 5 is a longitudinal sectional view of an embodiment in which an intermediate object is not attached in the outer column and distances to respective distal end faces of the first contact sections, the second contact sections, and the third contact sections are formed equal with respect to a perpendicular direction line in the first embodiment of the present invention.

That is, the following expression holds (see FIG. 5).

$$S1=S2=S3$$

When the intermediate object 5 such as the friction plate is mounted between the first contact sections 31 and the fixed bracket 4, the distal end faces 31a at the distal ends of the first contact sections 31 are formed to be located further on the inward side of the outer column A, that is, the axis P side than the distal end faces 32a of the second contact sections 32 and the distal end faces 33a of the third contact sections 33.

Specifically, the distance S2 to the distal end faces 32a of the second contact sections 32 with respect to the vertical direction line Lv that passes the axis P in the vertical direction and the distance S3 to the distal end faces 33a of the third contact sections 33 with respect to the vertical direction line Lv are formed to be substantially equal to each other. That is, the following expression holds.

$$S2=S3$$

The distance S1 to the distal end faces 31a of the first contact sections 31 with respect to the vertical direction line Lv that passes the axis P in the vertical direction is shorter than the distance S2 and the distance S3.

That is, the following expression holds.

$$S1<S2, S1<S3$$

When the intermediate object 5 such as the friction plate is mounted between the first contact sections 31 and the fixed bracket 4, a distance obtained by adding a width direction dimension of the intermediate object 5 to the distance S1 to the distal end faces 31a of the first contact sections 31 with respect to the vertical direction line Lv that passes the axis P in the vertical direction is formed to be substantially the same as the distance S2 and the distance S3.

That is, the following expression holds.

S1+WIDTH DIRECTION DIMENSION OF INTERMEDIATE OBJECT 5=S2=S3

Figure 3A:
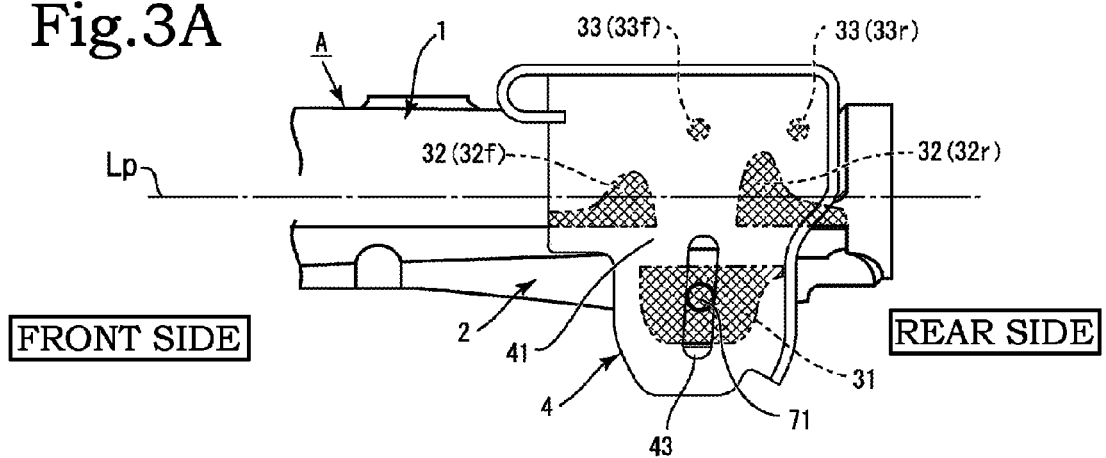
FIG. 3A is a main part side view showing a contact state of first contact sections to third contact sections and fixed side sections of a fixed bracket in a tilt intermediate position in the first embodiment.
Figure 3B:
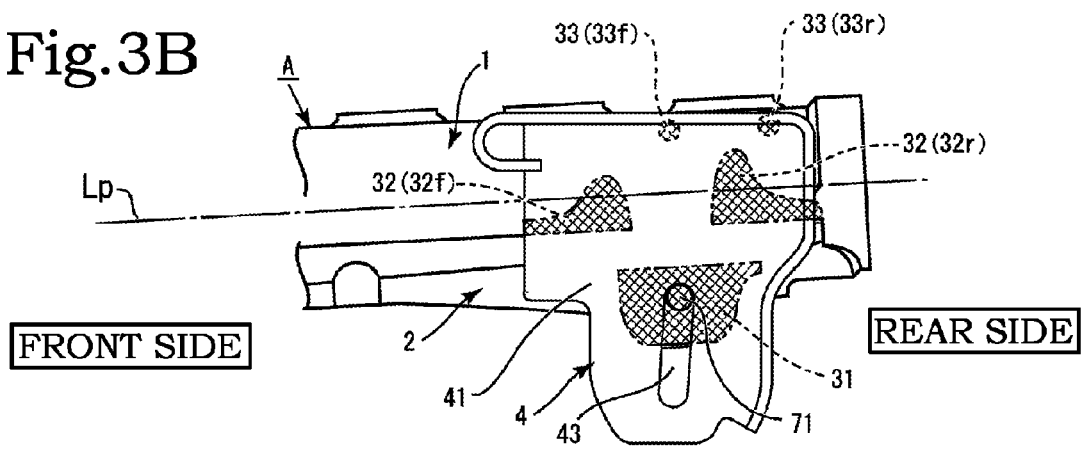
FIG. 3B is a main part side view showing a contact state of the first contact sections to the third contact sections and the fixed side sections of the fixed bracket in a tilt upper stage position in the first embodiment.
Figure 3C:
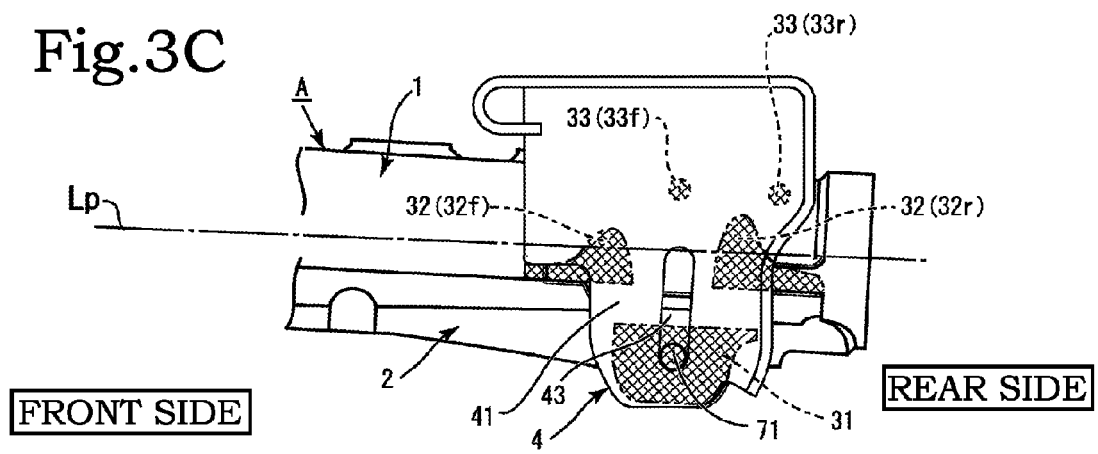
FIG. 3C is a main part side view showing a contact state of the first contact sections to the third contact sections and the fixed side sections of the fixed bracket in a tilt lower stage position in the first embodiment.

FIGS. 3A to 3C show a positional relation of the outer column A with respect to the fixed bracket 4 in a lever-tightened state after tilt adjustment completion. The positional relation shows contact states of the first contact sections 31 to the third contact sections 33 and the fixed side sections 41 concerning three positions where the outer column A is in an intermediate stage, an upper stage, and a lower stage with respect to the fixed bracket 4.

According to tilt adjustment, when the outer column A is in the position of the intermediate stage with respect to the fixed bracket 4, that is, a neutral position, the outer column A is horizontal with respect to the fixed bracket 4 (see FIG. 3A). Note that, even if the outer column A is horizontal with respect to the fixed bracket 4, since the rear side, that is, a steering wheel mounting side of the fixed bracket 4 inclines upward, the outer column A inclines upward on the rear side.

According to the tilt adjustment, when the outer column A is in the upper stage position with respect to the fixed bracket 4, the rear side of the outer column A is in the topmost position (see FIG. 3B). At this point, contact parts of the first contact sections 31, the second contact sections 32, and the third contact sections 33 and the fixed side sections 41 move upward to be above the position of the intermediate stage. However, all of the first contact sections 31, the second contact sections 32, and the third contact sections 33 can maintain the contact states.

According to the tilt adjustment, when the outer column A is in the lower stage position with respect to the fixed bracket 4, the position of the outer column A moves down (see FIG. 3C). However, since the outer column A includes the third contact sections 33, even in the tilt lower stage position, the third contact sections 33 can come into contact with substantially intermediate parts of the fixed side sections 41. At this point, the contact parts of the first contact sections 31, the second contact sections 32, and the third contact sections 33 and the fixed side sections 41 move downward to be below the position of the intermediate stage. However, all of the first contact sections 31, the second contact sections 32, and the third contact sections 33 can maintain the contact states.

Consequently, tightening rigidity is improved. The second contact sections 32 and the third contact sections 33 are alternately formed as the front-side second contact section 32f, the front-side third contact section 33f, the rear-side second contact section 32r, and the rear-side third contact section 33r from the vehicle body front side in the axial direction of the outer column A. Further, the third contact sections 33 are formed in advance in parts where rigidity decreases in the case of the tilt lower stage position. Since the contact sections come into contact with target positions in this way, rigidity during tightening is improved.

The second contact sections 32 have a shape extending in the up-down direction and come into contact with the fixed side sections 41 over the up-down direction. Therefore, a tightening retaining force is stabilized. Further, in the second contact sections 32, when the extended section 32c and the extended section 32d are formed in the axial direction respectively in the front-side second contact section 32f and the rear-side second contact section 32r, the contact area with the fixed side sections 41 increases and rigidity is improved.

As explained above, in the lever-tightened state after the tilt adjustment, the first contact sections 31, the second contact sections 32, and the third contact sections 33 are formed in the parts where rigidity tends to decrease. By bringing the contact sections into contact with the fixed bracket 4 targeting desired parts to be brought into contact with the contact sections, it is possible to suppress variation of rigidity due to a tilt adjustment position and maintain a stable tightening retaining force. Since the fixed bracket 4 and the outer column A partially come into contact with each other via the first contact sections 31, the second contact sections 32, and the third contact sections 33, a bending amount of both the fixed side sections 41 decreases. Therefore, it is possible to improve rigidity.

Further, by partially bringing the fixed bracket 4 and the outer column A into contact with each other using the first contact sections 31, the second contact sections 32, and the third contact sections 33, it is possible to reduce machining costs without increasing machined surfaces of the outer column A. There are partially a plurality of distal end faces of the first contact sections 31, the second contact sections 32, and the third contact sections 33 in both of the up-down direction and the axial direction of the outer column A. Therefore, it is possible to keep a tightening retaining force in all tilt adjustment positions. Also, it is possible to improve the rigidity of an entire steering column.

Next, the second embodiment of the present invention is explained. In the second embodiment, as shown in FIGS. 6A and 6B, the outer column A includes the first contact sections 31 and the third contact sections 33. The second contact sections 32 are not provided. The other components of the outer column A are substantially the same as the components of the outer column A in the first embodiment.

The first contact sections 31 are formed on the outer side surfaces of the tightening sections 21 (see FIGS. 6A and 6B, etc.). The configuration of the first contact sections 31 is substantially the same as the configuration in the first embodiment. The third contact sections 33 are located above the axis P of the embracing inner circumferential section 1a of the embracing main body section 1 of the outer column A and formed to project in the horizontal diameter direction. Similarly to the first embodiment, one or a plurality of third contacts sections 33 are formed along the axial direction of the embracing main body section 1.

In the second embodiment, when two third contact sections 33 are formed along the axial direction, the configuration of the third contact sections 33 is substantially the same as the configuration of the two third contact sections 33 formed in the first embodiment. As in the first embodiment, the front-side third contact section 33$f$ located on the front side and the rear-side third contact section 33$r$ located on the rear side are formed in substantially the same height positions from the axis line Lp (see FIG. 6A). An interval in the axial direction between the front-side third contact section 33$f$ and the rear-side third contact section 33$r$ is set as appropriate.

As a specific example, a configuration is explained in which the shapes and the sizes of the areas of the respective distal end faces 33$a$ of the front-side third contact section 33$f$ and the rear-side third contact section 33$r$ are different. Concerning the front-side third contact section 33$f$ and the rear-side third contact section 33$r$, the shape of the distal end face 33$a$ of the front-side third contact section 33$f$ is a circular shape and the shape of the distal end face 33$a$ of the rear-side third contact section 33$r$ is a square shape such as a substantially regular square shape (see FIG. 6A). The distal end face 33$a$ of the rear-side third contact section 33$r$, which is the third contact section 33 on the rear side, is sometimes set larger than the distal end face 33$a$ of the front-side third contact section 33$f$, which is the third contact section 33 on the front side (see FIG. 6A).

In this way, the distal end face 33$a$ of the rear-side third contact section 33$r$ is formed larger than the distal end face 33$a$ of the front-side third contact section 33$f$. Therefore, in a normal tightening state by a tightening fixture, a contact area of the third contact section on the rear side and the fixed side section of the fixed bracket increases. It is possible to make a tightening state on a steering wheel mounting side firm and stable.

In the positions of surfaces orthogonal to each other in the horizontal diameter direction on the distal end faces 31$a$ of the first contact sections 31 and the distal end faces 33$a$ of the third contact sections 33, there are the following two cases: a case in which the distal end faces 31$a$ of the first contact sections 31 and the distal end faces 33$a$ of the third contact sections 33 are located on the same surfaces; and a case in which the distal end faces 33$a$ of the third contact sections 33 project further outward than the distal end faces 31$a$ of the first contact sections 31.

That is, a relation between the distance S1 to the distal end faces 31$a$ of the first contact sections 31 and the distance S3 to the distal end faces 33$a$ of the third contact sections 33 is as described below with respect to the vertical direction line Lv.

$$S1 \leq S3$$

When the intermediate object 5 such as the friction plate is mounted between the first contact sections 31 and the fixed bracket 4, a distance obtained by adding a width direction dimension of the intermediate object 5 to the distance S1 to the distal end faces 31$a$ of the first contact sections 31 with respect to the vertical direction line Lv that passes the axis P in the vertical direction is formed to be substantially the same as the distance S3.

FIGS. 6C and 6D show a positional relation between the fixed bracket 4 and the outer column A in a lever-tightened state after tilt adjustment completion. The positional relation shows contact states of the first contact sections 31 and the third contact sections 33 and the fixed side sections 41 concerning two positions where the outer column A is in an upper stage and a lower stage with respect to the fixed bracket 4.

According to tilt adjustment, when the outer column A is in the upper stage position with respect to the fixed bracket 4, the rear side of the outer column A is the topmost position (see FIG. 6C). At this point, contact parts of the first contact sections 31, the third contact sections 33, and the fixed side sections 41 move upward to be above the position of the intermediate stage. However, all of the first contact sections 31 and the third contact sections 33 can maintain the contact states.

According to the tilt adjustment, when the outer column A is in the lower stage position with respect to the fixed bracket 4, the position of the outer column A moves down (see FIG. 6D). At this point, the contact parts of the first contact sections 31 and the third contact sections 33 and the fixed side sections 41 move downward to be below the position of the intermediate stage. However, all of the first contact sections 31 and the third contact sections 33 can maintain the contact states. In this way, since the distal end face of the rear-side third contact section 33$r$ is larger than the distal end face of the front-side third contact section 33$f$, it is possible to make a tightening state on a steering wheel mounting side firm. It is possible to suppress a backlash. Consequently, tightening rigidity of the steering column is improved.

In a second embodiment, at least the two third contact sections are formed at a predetermined interval along the axial direction. Therefore, it is possible to further stabilize the support by the fixed bracket in the upward position in the vertical diameter direction of the outer column. In a third embodiment, the distal end face of the third contact section on the rear side is formed larger than the distal end face of the third contact section on the front side. Therefore, in a normal tightening state by the tightening fixture, the contact area of the third contact section on the rear side and the fixed side section of the fixed bracket increases. It is possible to make a tightening state on the rear side of the outer column, that is, the steering wheel mounting side firm and stable.

In a fourth embodiment, when tilt/telescopic adjustment is completed and the fixed bracket and the outer column are tightened by the tightening fixture, variation of a contact state of the fixed side sections of the fixed bracket and the outer column is prevented such that contact is uniformly performed. In the outer column, the first contact sections to the third contact sections are provided at appropriate intervals in the vertical direction (the up-down direction) of the outer column. The third contact sections and the second contact sections are located on the same surface in the horizontal direction line. The first contact sections are located in positions not beyond the third contact sections and the second contact sections.

Consequently, irrespective of which of the intermediate stage, the upper stage, and the lower stage the respective distal end faces of the first contact sections, the second contact sections, and the third contact sections and the fixed side sections of the fixed bracket are located, it is possible to surely bring the contact sections and the fixed side sections into contact with each other. In this way, the first contact sections to the third contact sections are formed in parts where the rigidity in the fixed side sections tends to be particularly low, that is, parts where deformation tends to occur during the tightening by the fixed bracket and the tightening fixture. Therefore, it is possible to bring the contact sections and the fixed side sections into contact with each other in parts where the contact sections and the fixed side sections should be brought into contact with each other or near these parts. Consequently, irrespective of in which positions the first to third contact sections and the fixed side sections are present according to tilt adjustment of contact states of the first to third contact sections and the fixed side sections, it is possible to always maintain fixed contact states, suppress variation of a tightening pressure by the tightening fixture, and maintain stable tightening rigidity.

Since the fixed bracket and the first to third contact sections cause a partial contact state, a bending amount that occurs in the fixed side sections of the fixed bracket decreases. Also, it is possible to improve rigidity. Since both of the outer column and the fixed bracket partially push parts with low rigidity each other, it is possible to improve performance and reduce machining costs without increasing unnecessary machined surfaces. Since the first to third contact sections are provided, there are partially a plurality of contact parts in both of the up-down direction and the axial direction of the fixed side sections of the fixed bracket. Therefore, it is possible to keep a retaining force to the outer column in all tilt positions. It is also possible to improve the rigidity of the steering column. In particular, in the tilt lower stage position where rigidity tends to decrease, the third contact sections come into contact with substantially intermediate positions in the up-down direction of the fixed side sections of the fixed bracket to prevent the decrease in the rigidity. Therefore, a tilt position retaining force is improved.

In a fifth embodiment, the third contact sections are formed in a cylindrical protrusion shape. Contact with the fixed side sections of the fixed bracket changes substantially to point contact. A secure contact state can be realized. In a sixth embodiment, the second contact sections are separated into two at a predetermined interval along the axial direction. It is possible to surely bring the second contact sections into contact with the fixed side sections of the fixed bracket. In a seventh embodiment, the lower parts of the second contact sections are formed to extend along the axial direction. Therefore, since the second contact sections have a shape extending in the up-down direction, it is possible to increase the contact area with the fixed side sections of the fixed bracket. The fixed side sections and the second contact sections come into contact with each other in the up-down direction even in parts where tightening rigidity decreases. Therefore, the tightening rigidity is stabilized.

What is claimed is:

1. A steering device, comprising:
an inner pipe;
an outer column that includes an embracing main body section embracing the inner pipe and a clamp configured by tightening sections formed on both sides in a width direction of a slit section, the slit section being formed in a lower part of the embracing main body section and along an axial direction;
a fixed bracket that includes fixed side sections holding therebetween the outer column;
a tightening fixture that tightens the fixed bracket and the outer column;
first contact sections that are forming on respective outer surface sides of both tightening sections of the outer column;
second contact sections formed above both tightening sections; and
third contact sections that are located above an axis of the embracing main body section of the outer column and formed to project in the width direction,
wherein the second contact sections are formed below the third contact sections, and
wherein the second contact sections are separated into two sections at a predetermined interval along the axial direction.

2. The steering device according to claim 1, wherein at least a pair of the third contact sections is formed at a predetermined interval along the axial direction.

3. The steering device according to claim 2, wherein the second contact sections are formed in an up-down direction of the embracing main body section above both tightening sections and below the third contact sections,
wherein distal end faces of the third contact sections and the second contact sections are located on a same vertical plane, and
wherein the first contact sections are located in positions not beyond the distal end faces of the third contact sections and the second contact sections.

4. The steering device according to claim 2, wherein the third contact sections are formed in a cylindrical protrusion shape.

5. The steering device according to claim 1, wherein the second contact sections are formed in an up-down direction of the embracing main body section.

6. The steering device according to claim 5, wherein lower parts of the second contact sections are formed to extend along the axial direction.

7. The steering device according to claim 5, wherein distal end faces of the third contact sections and the second contact sections are located on a same vertical plane, and wherein the first contact sections are located in positions not beyond the distal end faces of the third contact sections and the second contact sections.

8. The steering device according to claim 7, wherein lower parts of the second contact sections are formed to extend along the axial direction.

9. The steeling device according to claim 1, wherein the third contact sections are formed in a cylindrical protrusion shape.

10. The steering device according to claim 9, wherein lower parts of the second contact sections are formed to extend along the axial direction.

11. The steering device according to claim 1, wherein distal end faces of the third contact sections and the second contact sections are located on a same vertical plane, and
wherein the first contact sections are located in positions not beyond the distal end faces of the third contact sections and the second contact sections.

12. The steering device according to claim 11, wherein lower parts of the second contact sections are formed to extend along the axial direction.

\* \* \* \* \*